United States Patent [19]

Dowla et al.

[11] Patent Number: 5,373,486
[45] Date of Patent: Dec. 13, 1994

[54] SEISMIC EVENT CLASSIFICATION SYSTEM

[75] Inventors: Farid U. Dowla, Castro Valley; Stephen P. Jarpe, Brentwood; William Maurer, Livermore, all of Calif.

[73] Assignee: The United States Department of Energy, Washington, D.C.

[21] Appl. No.: 13,268

[22] Filed: Feb. 3, 1993

[51] Int. Cl.$^5$ .............................................. H04B 1/06
[52] U.S. Cl. .................................. 367/135; 367/136; 364/421; 181/101
[58] Field of Search ................ 367/135, 136; 364/421; 181/101

[56] References Cited

U.S. PATENT DOCUMENTS

| | | | |
|---|---|---|---|
| 4,236,233 | 10/1980 | Davis, Jr. et al. | 367/71 |
| 4,713,775 | 12/1987 | Scott et al. | 364/513 |
| 4,783,754 | 10/1988 | Bauck et al. | 364/513.5 |
| 4,811,308 | 3/1989 | Michel | 367/136 |
| 4,916,615 | 4/1990 | Chittineni | 364/421 |
| 4,939,648 | 7/1990 | O'Neil et al. | 364/422 |
| 4,979,124 | 12/1990 | Sachse et al. | 364/507 |
| 5,054,006 | 10/1991 | Gimber et al. | 367/136 |
| 5,056,066 | 10/1991 | Howard | 367/72 |
| 5,146,541 | 9/1992 | Speidel | 395/21 |
| 5,181,171 | 1/1993 | McCormack et al. | 364/421 |

OTHER PUBLICATIONS

J. Bitto et al., "Sesmic Event Discrimination Using Neural Networks", 23rd Asilomar Conference on Signals, Systems and Computers, vol. 1, pp. 326–330, Oct. 30–Nov. 1, 1989.
Hsi-Ho Liu, "A Rule-Based System for Automatic Seismic Discrimination", Pattern Recognition, vol. 18, No. 6, pp. 459–463, 1985.
Ibrahim Palaz et al., "Waveform Recognition Using Neural Networks", Geophysics: The Leading Edge of Exploration, Mar. 1990.

Primary Examiner—J. Woodrow Eldred
Attorney, Agent, or Firm—Henry Sartorio; Roger S. Gaither; William R. Hoser

[57] ABSTRACT

In the computer interpretation of seismic data, the critical first step is to identify the general class of an unknown event. For example, the classification might be: teleseismic, regional, local, vehicular, or noise. Self-organizing neural networks (SONNs) can be used for classifying such events. Both Kohonen and Adaptive Resonance Theory (ART) SONNs are useful for this purpose. Given the detection of a seismic event and the corresponding signal, computation is made of: the time-frequency distribution, its binary representation, and finally a shift-invariant representation, which is the magnitude of the two-dimensional Fourier transform (2-D FFT) of the binary time-frequency distribution. This pre-processed input is fed into the SONNs. These neural networks are able to group events that look similar. The ART SONN has an advantage in classifying the event because the types of cluster groups do not need to be pre-defined. The results from the SONNs together with an expert seismologist's classification are then used to derive event classification probabilities.

20 Claims, 9 Drawing Sheets

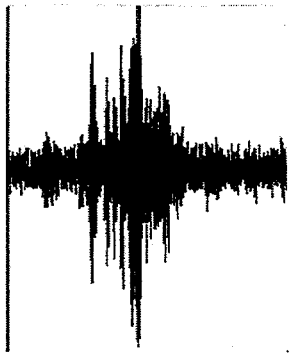 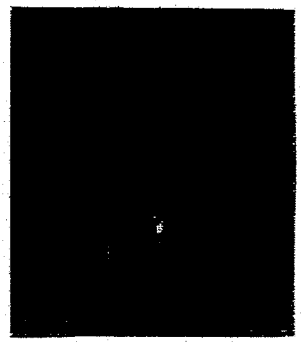 
FILTERED SEISMOGRAM     SPECTROGRAM     BINARY PATTERN
CAR     FIG. 3A
 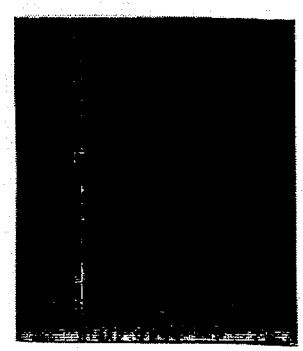 
FILTERED SEISMOGRAM     SPECTROGRAM     BINARY PATTERN
LOCAL     FIG. 3B
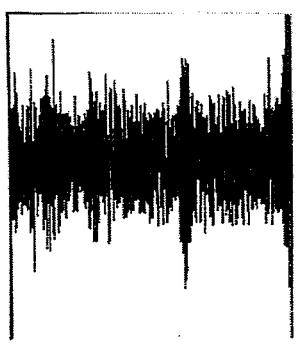  
FILTERED SEISMOGRAM     SPECTROGRAM     BINARY PATTERN
NOISE     FIG. 3C

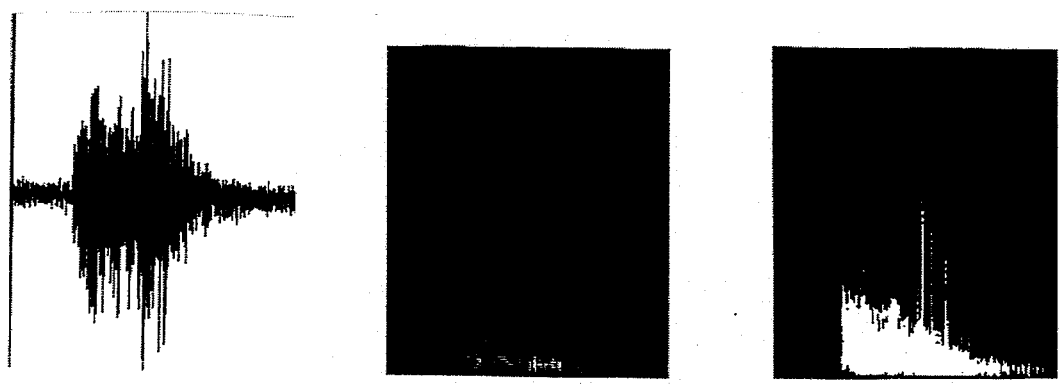
FILTERED SEISMOGRAM   SPECTROGRAM   BINARY PATTERN
REGIONAL   FIG. 3D
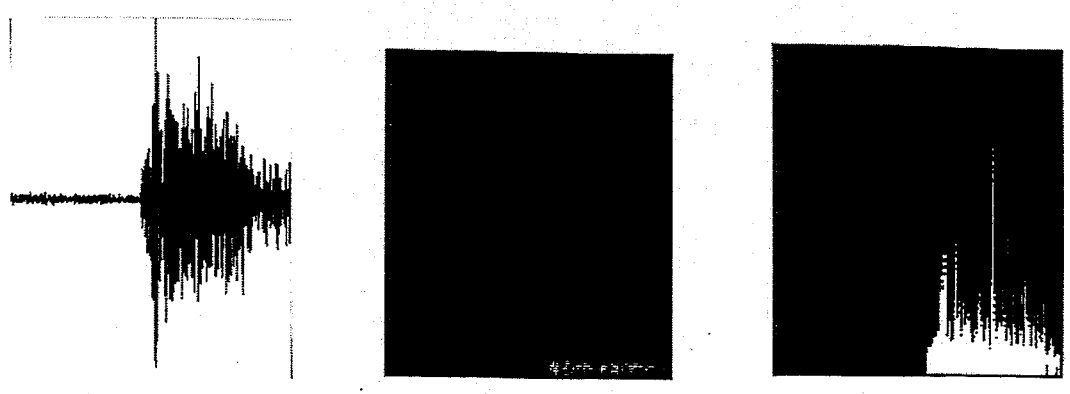
FILTERED SEISMOGRAM   SPECTROGRAM   BINARY PATTERN
TELESEISMIC   FIG. 3E
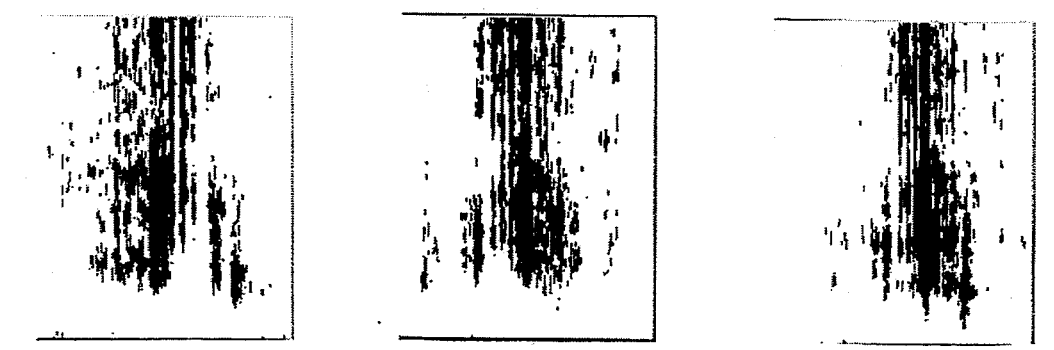
CAR   FIG. 4A

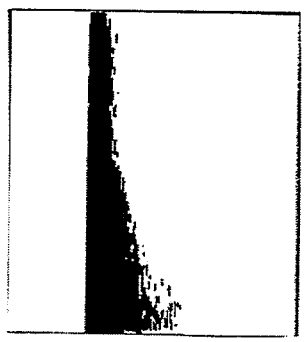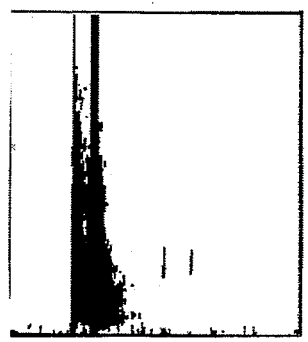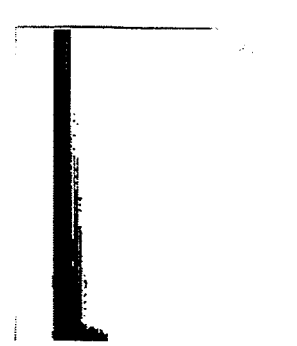
LOCAL   FIG. 4B
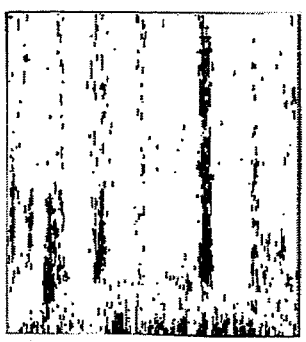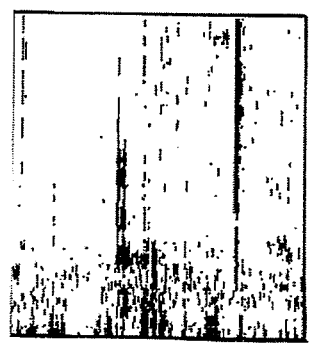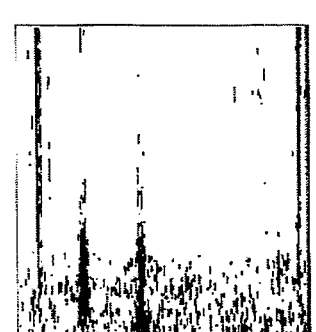
NOISE   FIG. 4C
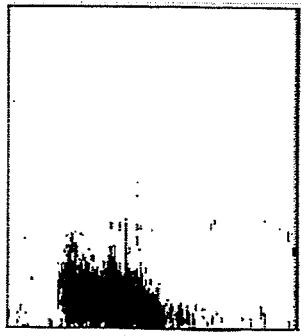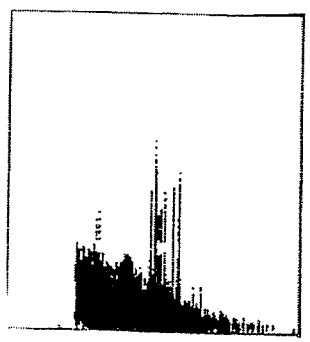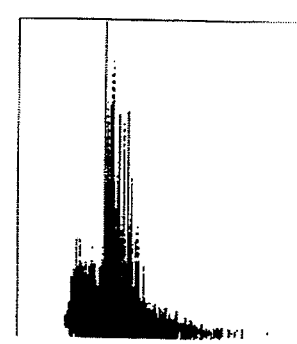
REGIONAL   FIG. 4D

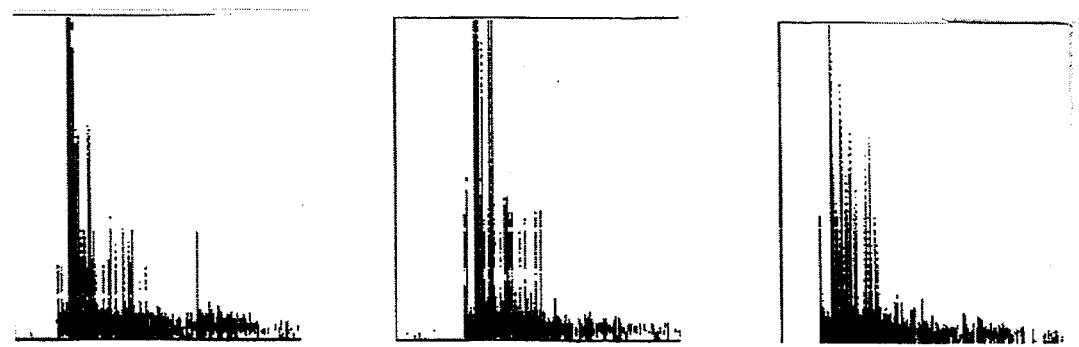
TELESEISMIC   FIG. 4E
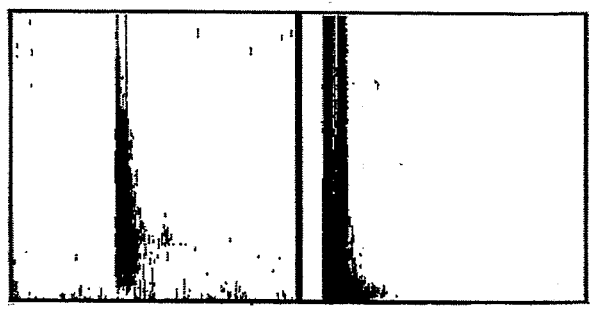
K1
FIG. 6A
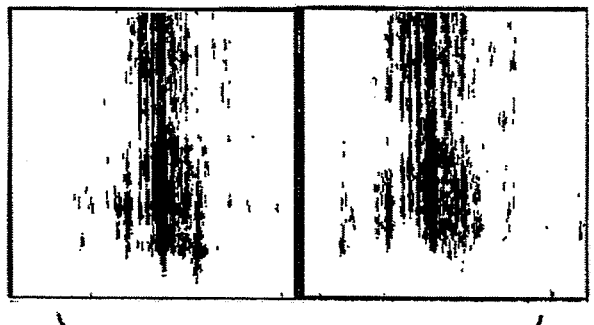
K2
FIG. 6B
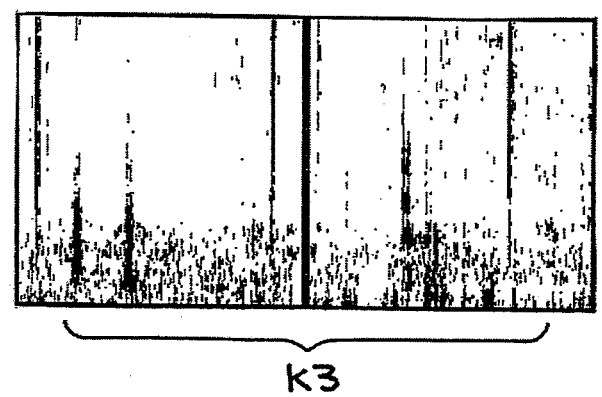
K3
FIG. 6C

| SONN'S CLUSTER | | ANALYST'S CLUSTER | | | | | |
|---|---|---|---|---|---|---|---|
| | DESCRIPTION | CAR | NOISE | LOCAL | REGIONAL | TELESEISMIC |
| K-1: BROADBAND, SHORT-DURATION | | 0 (.0) | 1 (.125) | 5 (.625) | 2 (.25) | 0 (.0) |
| K-2: BROADBAND, PERIODIC | | 4 (1.) | 0 (.0) | 0 (.0) | 0 (.0) | 0 (.0) |
| K-3: NOISY | | 1 (.143) | 4 (.571) | 2 (.246) | 0 (.0) | 0 (.0) |
| K-4: LOW SNR | | 0 (.0) | 0 (.0) | 1 (.333) | 1 (.333) | 1 (.333) |
| K-5: BROADBAND, DECAY | | 0 (.0) | 0 (.0) | 0 (.0) | 2 (.286) | 5 (.714) |
| K-6: MIDBAND, DECAY | | 0 (.0) | 0 (.0) | 0 (.0) | 5 (.714) | 2 (.286) |
| K-7: PERIODIC, MULTIPLE | | 4 (.571) | 1 (.143) | 1 (.143) | 0 (.0) | 1 (.143) |

FIG. 5

SEISMIC EVENT CLASSIFICATION SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

This invention relates generally to the identification and classification of seismic sources using transient signals recorded passively with geophones or seismometers. More specifically, the invention derives seismic event classification probabilities by computing a time-frequency distribution, filtering out 2-dimensional noise, computing a binary and then a shift-invariant representation, and finally employing a self-organizing neural network for source identification.

2. Description of Related Art

Monitoring networks of seismic stations detect hundreds of thousands of seismic events annually. A variety of types of sources are responsible for these events which are detected and recorded by world wide seismic networks. Typical seismic sources include earthquakes, underground nuclear explosions, mining shots, cultural activities such as moving trucks or trains, and natural noise sources such as the wind, ocean waves, or the breaking of glaciers. To verify nuclear test ban treaties, all events detected by monitoring networks must be analyzed. Because of the large number of events that need to be identified, the problem requires an automated analysis platform. The various methods used in prior knowledge-based or expert systems have been only partially successful in automating seismic signal interpretation. This is because data characteristics vary significantly from event to event and because the solution is difficult to describe with a finite set of rules that are commonly used in conventional knowledge-based expert systems.

Different systems have been developed which classify and identify seismic sources. The following patents and articles describe these systems.

U.S. Pat. No. 4,713,775 is directed to an intelligent assistant system for using and operating computer system capabilities to solve problems. The patent uses some concepts of artificial intelligence to solve problems, however, the seismic event classification system. (SECs) described is an invention for interpreting seismic events. SECs interpret an event in the presence of varying noise by incorporating signal processing, neural networks, image understanding and a production rule system. The problem with static correction of seismic reflection data described in the patent is a highly specialized algorithm for a completely different problem than that of seismic event interpretation.

U.S. Pat. No. 4,939,648 is directed to a method and apparatus for monitoring well logging information. The patent uses signal processing on time series signals. SECs use a neural network to do pattern recognition. The patent uses observations related to situations in a knowledge base to do pattern recognition. The problem addressed in the patent is specific to well logging instrumentation and analysis.

An article by J. Bitto et al., entitled "Seismic Event Discrimination Using Neural Networks," 23rd Asilomar Conference on Signals, Systems, and Computers, Vol. 1, pp. 326–330, November 1989, describes a method used to discriminate between two known classes of events, for example earthquakes and nuclear tests. It describes use of a one-dimensional correlation of the data with supervised back propagation. SECs interpret any seismic event in the presence of varying noise by incorporating two-dimensional spectral estimation of a non-stationary process, making use of an unsupervised self-organizing neural network, using image understanding and production rule systems.

In the article by H. Liu, entitled "A Rule-Based System for Automatic Seismic Discrimination," *Pattern Recognition*, Vol. 18, No. 6, pp. 459–463, (1985), artificial intelligence technology is proposed. This paper is a proposal to solve a seismic discrimination problem using rules. The paper generally surveys the subject of seismic event discrimination for treaty verification, rule based systems, and a paragraph on pattern recognition.

In the article by I. Palaz et al., entitled "Waveform recognition Using Neural Networks," Geophysics: The Leading Edge of Exploration, Round Table, March 1990, supervised back propagation neural networks are proposed to recognize waveforms. The paper does not describe a method for interpretation of an event in the presence of noise by incorporating a number of new technologies.

SEC's combine a number of technologies and novel algorithms to interpret seismic events using pattern recognition techniques and high level reasoning. All of the above papers and patents are related by only a key word or by use of a particular technology.

Often, only human analysts are able to classify seismic events based on their experience of looking at many seismic events. The basic principle of this invention was motivated by how a human expert views the entire segment of a detected seismic waveform, using both seismic phase and the coda characteristics of the transient signals, to classify a given event.

It is proposed that with the proper representation of the seismic signal and by employing the machine learning properties of a self-organizing neural network, automation of seismic event classification can be achieved. The present invention provides such a method and article.

SUMMARY OF THE INVENTION

It is an object of the present invention to provide an apparatus for classifying seismic events using passively recorded seismic signals.

It is another object of this invention to provide a method to incorporate the machine learning properties of self-organizing neural network to identify seismic events.

It is still another object of the invention to provide a representation of nonstationary or transient signals, encountered in geophysical and biomedical sciences, for their analysis and interpretation.

It is also another object of the invention to automate the interpretation of seismic events for the purpose of surveillance and intelligence.

Another object of the invention is to provide a method and apparatus for classifying seismic signals to verify nuclear test ban treaties.

In the computer interpretation of seismic events, the critical first step is to identify the general class of an unknown seismic event using the entire segment of a detected event. The successful classification of a seismic event requires many levels of careful analysis and representation as outlined in the following:

The classification of a received signal is accomplished by first computing the time-frequency distribution of the detected event with a rule that maintains both the short- and long-time frequency characteristics of the signal. Because the pre-event background noise can severely distort the characteristics of the segment under analysis, the time-frequency characteristics of the pre-event data is used to remove the noise from the two-dimensional distribution of the signal by a process of spectral subtraction. To further enhance the features of the resulting image, a binary representation of the two-dimensional data is computed employing a signal thresholding operation. Next, to remove time registration problems that can occur due to the fact that the event origin is not known precisely, a shift-invariant representation of the processed data is computed. This transformation maintains the features required for seismic event identification. Finally, employing the adaptive machine learning properties of self-organizing neural networks on a large database of previously recorded events, a method is developed to identify a new event along with a confidence factor.

BRIEF DESCRIPTION OF THE DRAWINGS

FIG. 3 shows the processing of different classes of signals to a binary representation.

FIG. 4 shows the binary representation of multiple signals within the same class.

FIG. 5 shows the results of the neural network in distributing the seismic events among its various cluster nodes.

DETAILED DESCRIPTION OF THE INVENTION

Figure 1:
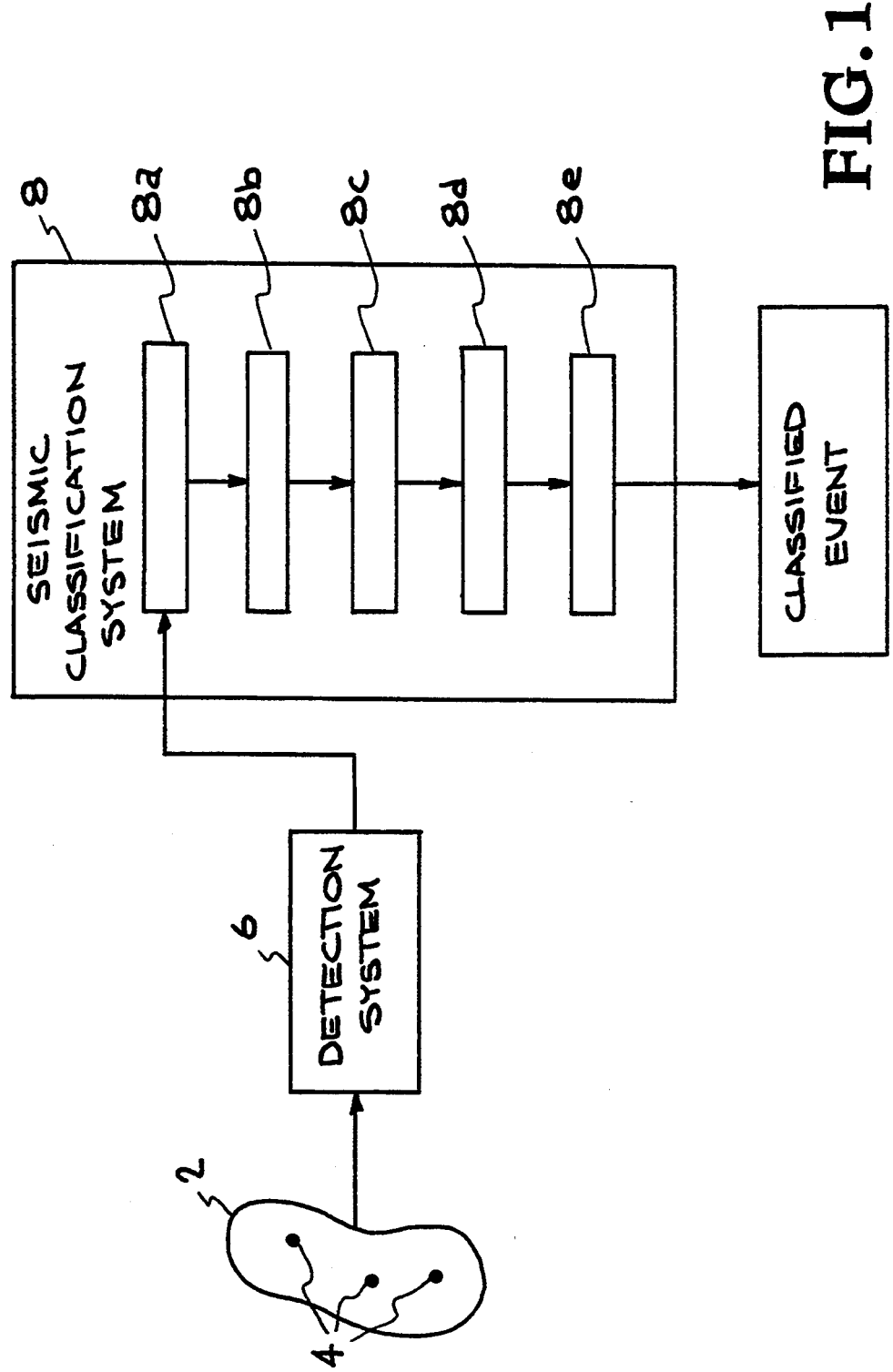
FIG. 1 is a block diagram of the preferred embodiment.
Figure 2:
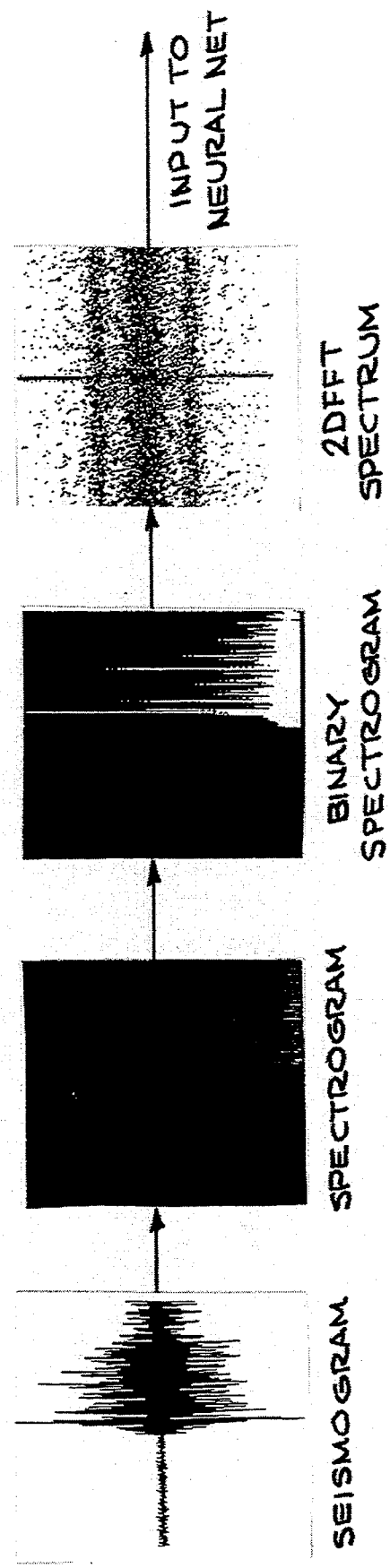
FIG. 2 shows the pre-processing sequence used to construct the input to the neural network of the preferred embodiment.
Figure 6D:
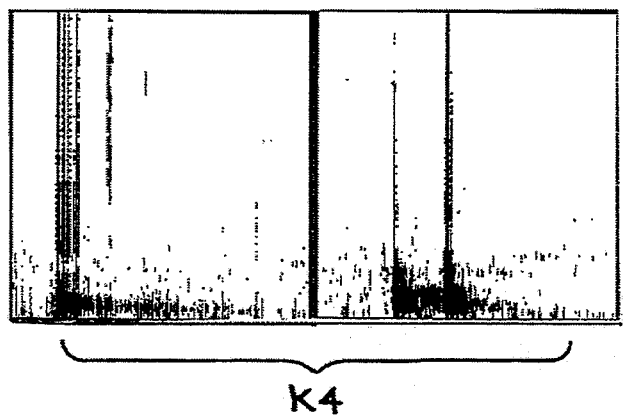
FIG. 6 shows Kohonen cluster examples.
Figure 6E:
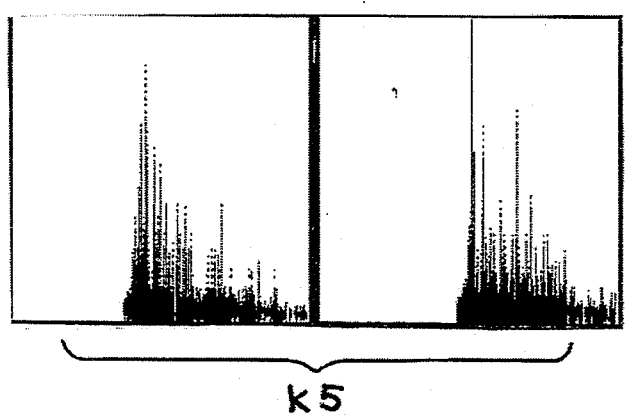
Figure 6F:
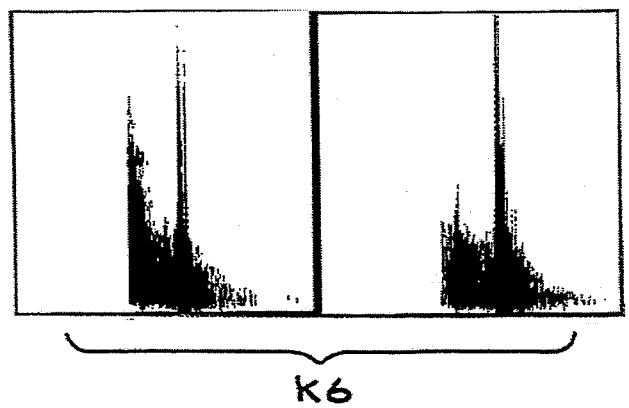
Figure 6G:
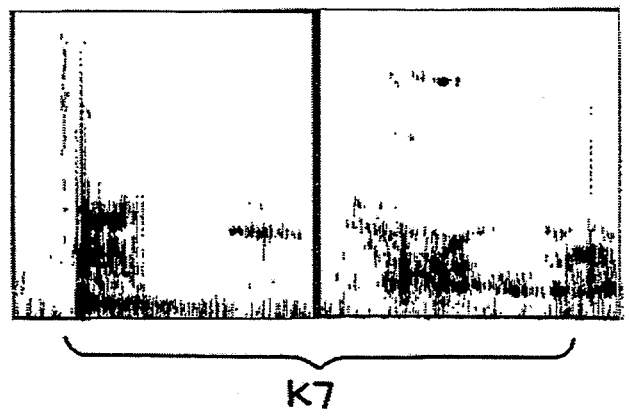

The preferred embodiment of the present invention is shown in FIG. 1. Monitoring network 2, comprised of Seismic Sensors 4, feeds signals into Detection System 6. The Detection System consists of a real time signal energy estimation process at each seismic station. The process continuously computes a ratio of the signal Short Term Average (STA) energy to its Long Term Average (LTA) energy. When this ratio exceeds a threshold of 2.5 at two or more stations, then a event is declared to have occurred. All the stations in the monitoring network save the 400 second event segment. Seismic signals are fed into Seismic Classification System 8 comprised of M8($a$) through M8($e$). M8($a$) receives signals, in the form of a seismogram, from Detection System 6. FIG. 1 shows the processing of the corresponding seismogram as follows: M8($a$) computes the time-frequency distribution (i.e. spectrogram). M8($b$) computes a binary representation from the time-frequency distribution. The output from M8($b$) is fed into M8($c$) where a shift-invariant representation is computed. This representation is the magnitude of the two-dimensional fast Fourier transform (2-D FFT) of the binary time-frequency distribution. The output from M8($c$) is fed into a self-organizing neural network (SONN) in M8($d$). M8($e$) uses clustering information from the SONN to determine event classification and probability estimations. FIG. 2 shows the transformation process of a seismogram into a two-dimensional Fourier transform which is input into a neural network.

1. Computing time-frequency distribution (spectrogram).

Since frequency characteristics of transient seismic data is continuously changing with time, the power spectrum based on a single long duration window is not a meaningful representation of the signal. The time-frequency distribution (the spectrogram) of the data is a better representation for transients; signals whose characteristics as a function of time change rapidly (FIG. 3). Instead of computing the spectrum (the magnitude of the fast Fourier transform) over long segments of data, multiple spectra are computed over many small time windows (3 seconds in length) of the data. By using many such windows and sliding them in time with 50% overlap for the entire length of the 400 second segment, a two-dimensional (2-D) time-frequency distribution is obtained. This transformed data is then considered as a matrix of 256×256 real numbers. The first 50 seconds (or 32 columns) of the segment is the pre-event noise data. Transforming a time series data signal into a 2-D array of real numbers, or a 2-D image, effectively transforms a problem of signal analysis to one of image understanding.

Characteristics of seismic signals can change dramatically as a function of the background noise characteristics, the signal-to-noise ratio (SNR), and the signal propagation path. By considering both pre-event noise data, all principal phases (packets of energy arrivals such as the Pn, Pg, Sn, Lg, and Rg phases as known in the art), and coda (post phase data) characteristics, we are able to capture all the information in the received signal and represent them as function of both time and frequency in the computed spectrogram. The strength of the Seismic Event Classification System (SECs) derives from the fact that the analysis is not restricted to only the principal phases such as the P and the S wave which is the conventional practice.

2. Noise Filtering and Binary Representation (Binary Spectrogram).

The system is built to have an adaptive noise filtering capability. This helps interpret the event because the background noise can distort the buried signal of interest significantly. In order to remove the noise from the 2-D time-frequency distribution, a mean level of the noise signature of the spectrogram is computed by averaging the spectral magnitude values of the first 32 out of 256 columns of the spectrogram. This noise signature is then subtracted from all 256 columns of the spectrogram. Once the mean noise is removed from the data, the mean magnitude value and its standard deviation is then computed for the noise filtered spectrogram (FIG. 3). A thresholding operation is then performed where all pixel values equal to or greater than the mean plus one standard deviation are set to 1; otherwise the pixel value is set to 0. This simple thresholding operation is a powerful operation in extracting the important features of the signal for its classification (FIG. 4). This binary thresholding operation is also highly efficient from both storage and computation viewpoint because the effective number of bits required in this representation is a small fraction of the 2-D spectrogram of 256×256 real numbers.

3. Shift-Invariant Representation of the 2-D FFT Magnitude.

The Fourier transform is a widely used tool in signal processing and represents the signal amplitude and phase as a function of frequency (FIG. 2). The two-dimensional (2-D) Fourier transform is simply a generalization of the one-dimensional (1-D) Fourier transform and represents a 2-D signal or image in terms of its spatial frequency or wavenumber characteristics in two orthogonal directions. The 2-D FFT magnitude transformation of the binary spectrogram was a critical step in obtaining a translation and scale invariant representation of the data.

In seismic event interpretation, translation invariant representation is important because the location of the event, or the onset of the signal in time, is unknown. Because the distance of the event is unknown, the scale or the duration of the signal segment of interest is not known. By using the magnitude or 2-D FFT of the binary representation of the binary noise filtered spectrogram over a large time segment (400 seconds) of data, both scale- and translation-invariance are incorporated in the signal representation. The computed 2-D spectral values, from the 2-D FFT magnitude operation, are used as input to the self-organizing neural network.

4. Machine clustering of classes by self-organizing neural networks.

The incorporation of a self-organizing neural network is another critical step to the success of this invention. The Kohonen self-organizing learning algorithm (as previously known) can be used as the SONN. This machine learning scheme autonomously learns feature detectors in high dimensional patterns, such as images or faces, to discriminate between different classes of the input (FIG. 5). Other algorithms may be substituted for the Kohonen model.

In the self-organizing processing of the input patterns, input vectors are not just clustered into different groups, but in fact a topological or spatial ordering of the clusters are formed during the formation of the cluster nodes or groups. Each cluster node is represented by a set of input weights. The weights evolve during learning in the training phase of the system to minimize the sum of the distances of the input patterns from their corresponding cluster nodes as represented by the weights. Learning parameters to the Kohonen network are optimized by a trial and error process on the number of clusters. The optimum number of clusters of this classification system is generated using 7 clusters with a neighborhood size of 3, and an initial learning rate of 0.3. The neighborhood size determines the correlation of the adjacent clusters, and the learning rate defines how fast the weights are modified at each iteration of learning (FIG. 6).

A hybrid version of two SONN's is used in the preferred embodiment of the invention presented. This hybrid neural network is comprised of a Kohonen Network and an Adaptive Kohonen Network (AK). Another embodiment replaces the AK Network with an Adaptive Resonance Theory Network (ART). For the invention to be useful in a real-time analysis, the computing environment requires the speed of the neural network to be on the order of a few seconds. Training requires hours of computer time and repetitive presentation of the training events to adjust the weights of each cluster node. Once training is completed, the operation of classifying an arbitrary event takes only 3 to 4 seconds for the Kohonen model, and about 30 seconds for the AK or ART model. The Kohonen network has the advantage of being able to develop a highly resolved set of clusters. The AK and the ART networks are both capable of classifying and identifying an event which is not classifiable using the Kohonen network. The hybrid network exploits the strengths of each neural network (i.e. the speed and resolution of Kohonen, the new event capabilities of the AK or ART).

5. Event classification and probability estimation.

Like most other systems making use of neural networks, this invention has two modes of operation: the training mode and the classification mode.

In the training mode, probability estimates for the classification categories for a given cluster are found by dividing the number of events in a particular class in a cluster by the total number of events in that cluster. These probability estimates are found by using the system with many hundreds of events for which the ground truth is known.

In the classification mode, when a new event is detected, the signal is processed, as described in steps 1 through 4, and the neural network associates the new event into a certain cluster group by matching the input with the templates (or weights) of each cluster node. Since each cluster node represents the classes of events of interest with a degree of confidence, the system allows us to identify the classification of the new event.

Figure 7:
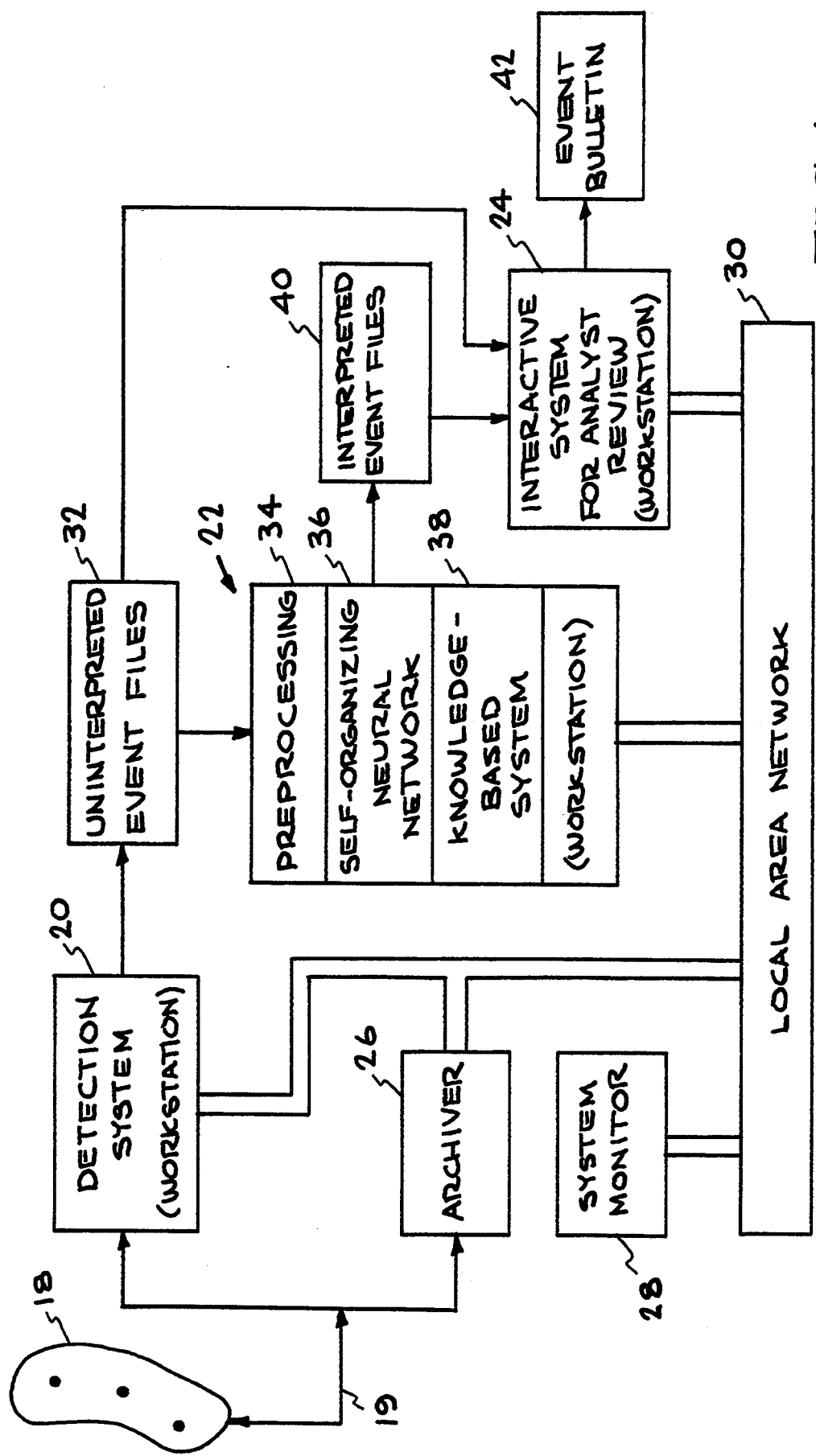
FIG. 7 is a block diagram of the Seismic Event Classification System architecture.

The apparatus facilitates evaluation of seismic data in a manner consistent with its use as a regional seismic monitoring system. The system has been designed for data acquisition, archival, processing, interpretation, and for development of new processing strategies. The system, as shown in FIG. 7, is comprised of three major components: a detection system 20, automated interpretation systems 22, and an interactive system 24. Integrated with these sub-systems are an archiver 26, and a monitor 28. Each sub-system is physically connected through a Local Area Network (LAN) 30. Data from the data acquisition system (using telephone lines connected to geophones in remote areas) comes into the detector on LAN 30. Detection system 20 receives data from existing seismic monitoring networks 18 over telephone lines 19, and sends uninterpreted event files 32 to automated interpretation systems 22 which is comprised of pre-processing unit 34, self-organizing neural network 36, and a knowledge-based system 38. Pre-processing unit 34 computes a time-frequency distribution, filters this distribution of background noise, produces a binary and then a shift-invariant representation, and sends this two-dimensional fast Fourier transform to SONN 36. Machine clustering of classes is accomplished in SONN 36 which creates interpreted event files 40 to be fed into interactive system 24 where an event bulletin 42 is produced. The flexibility of the system arises from its modular design and allows for the modification or addition of further processing systems.

Detection System

The detector system accepts continuous real-time data from the data acquisition system, filters the data into detection passbands, and applies a short-time-average (STA) to long-time-average (LTA) ratio event detection algorithm. When an event is detected, the system records the event and creates a network data file and places it in the "in" queue for it to be classified by the SONN based classification system. The detector also monitors background noise level at each station.

Knowledge-based System

The knowledge-based system is a rule-based expert system that identifies seismic phases, determines accurately the phase arrival times, and associates phases into events. This system uses the seismologist's knowledge and expresses it in the form of "if-then" rules. Because the SONN classifier has already classified the general class of the event, the rule-development and application is quite simple. With the use of the SONN, the performance of the expert system has improved significantly in extracting the phases and locating the event accurately.

The Interactive System

The Interactive Systems allows the analyst to review the automated interpretation of the seismic events. This system also allows interactive processing and analysis. Data is displayed with advanced graphics and windows. Data can be filtered, events located with new phases incorporated by the analyst, and the analysts comments and results can be entered into a bulletin.

Archiver/Monitor

The archiver/monitor archives event data to tape, maintains record of the contents of each tape on disk, and maintains a system summary log on disk. Normally processed data is archived from the "out" queue. The monitor keeps track of the available disk space and archives data from the other data queues as the disk space approaches maximum capacity.

Communications

The system communicates through the information stored in network data file format. The file contains station information, the raw seismogram, processed data, phase picks, event solutions, and measurements. The file format is simple and flexible. In fact, it is straight-forward to incorporate any file format into this analysis system.

Changes and modifications in the specifically described embodiments can be carried out without departing from the scope of the invention, which is intended to be limited by the scope of the appended claims.

We claim:

1. A method for automated seismic event classification, said method comprising the steps:
    detecting a seismic event signal produced from at least one seismic sensor station;
    pre-processing the detected seismic event signal to produce a pre-processed signal;
    classifying, using a self organizing neural network (SONN), the pre-processed signal from said seismic sensor station to produce a classified, pre-processed signal; and
    interpreting, using a knowledge based system, the classified pre-processed signal from said sensor station.

2. The method of claim 1, additionally including the steps:
    producing a seismogram from said detected seismic event signal; and
    computing a translation-invariant binary spectrogram from said seismogram.

3. The method of claim 2, wherein said translation-invariant binary spectrogram is a two-dimensional fast Fourier transform (2-D FFT).

4. The method of claim 1, wherein said seismic event is detected by a detection system which continuously computes a ratio of energies by dividing a short term average of said energies by a long term average of said energies and declares an event has occurred when said ratio exceeds a threshold of 2.5 at two or more seismic stations.

5. The method of claim 1, wherein the pre-processing step is carried out by:
    producing a seismogram from said detected seismic event signal;
    computing a time-frequency distribution from said seismogram;
    transforming said time-frequency distribution into a binary representation;
    computing a two-dimensional fast Fourier transform (2-D FFT) from said binary representation; and
    inputting said 2-D FFT into said self organizing neural network.

6. The method of claim 5, wherein the step of computing a time-frequency distribution from said seismogram is carried out by:
    computing a power spectrum over many 3 second length time windows;
    sliding said time windows with 50% overlap for a 400 second segment to form a two-dimensional time-frequency distribution; and
    formatting said two-dimensional time-frequency distribution into a matrix of 256 by 256 real numbers to form a spectrogram.

7. The method of claim 6, additionally including the step of noise filtering said two-dimensional time-frequency distribution by the steps of:
    computing a mean level of a noise signature by averaging a spectral magnitude of an initial 32 of 256 columns of said spectrogram; and
    subtracting said noise signature from all 256 columns of said spectrogram to form a noise filtered spectrogram.

8. The method of claim 7, wherein a binary spectrogram is computed from said noise filtered spectrogram by the steps of:
    computing a mean magnitude value from said noise filtered spectrogram;
    computing a standard deviation from said mean magnitude value; and
    performing a threshholding operation wherein all pixel values equal to or greater than said mean magnitude value plus one standard deviation are set to one, and wherein all pixel values less than said mean magnitude value plus one standard deviation are set to zero.

9. The method of claim 8, wherein a shift-invariant representation is computed from said binary spectrogram by the steps of:
    representing signal amplitude and phase of said binary spectrogram as a function of frequency to form a one-dimensional Fourier transform; and
    representing said one-dimensional Fourier transform in two orthogonal directions in terms of its spatial frequency or wavenumber to form a two-dimensional fast Fourier transform.

10. The method of claim 1, wherein said classifying step is carried out by:
    forming cluster nodes or groups from said pre-processed signals;
    topologically or spatially ordering of said clusters or groups;
    representing each cluster node by a set of weights that is evolved during learning in a training phase of the system to minimize the sum of the distances of the input patterns from their corresponding cluster nodes as represented by the weights; and optimizing learning parameters of said SONN by using 7 clusters with a neighborhood size of 3 and an initial learning rate of 0.3.

11. The method of claim 10, wherein said classifying step is carried out by:
   inputting said pre-processed signal into a Kohonen Network;
   monitoring said Kohonen Network with a matching algorithm;
   inputting said pre-processed signal into an Adaptive Kohonen Network or an Adaptive Resonance Theory Network if said matching algorithm determines that said Kohonen Network is unable to place said pre-processed signal into one of said cluster groups of said Kohonen Network.

12. The method of claim 1, wherein said classifying step is carried out by: operating a Seismic Event Classification System (SECS) in a training mode wherein probability estimates for classification categories for a given cluster are found by dividing the number of events in a particular class in a cluster by a total number of events in that cluster while using said SECS with many hundreds of events for which a ground truth is known; and
   operating the Seismic Event Classification System (SECS) in a classification mode when a new event is detected, wherein said neural network associates said new event into a certain cluster group by matching an input with templates (or weights) of each cluster node.

13. The method of claim 1, wherein said interpreting step is carried out by:
   inputting said classified pre-processed signals into a rule-based expert system that identifies seismic phases, phase arrival time, and event phase association thereby producing identities; and
   applying said identities to a set of if-then rules which use seismology data to interpret a seismic event.

14. An apparatus for automated seismic event classification, said apparatus comprising:
   means for detecting a seismic event signal produced from at least one seismic sensor station, said detecting means to produce a detected signal;
   means for pre-processing said detected signal to produce a pre-processed signal;
   means for classifying using a self organizing neural network (SONN), said pre-processed signal to produce a classified, pre-processed signal; and
   means for interpreting, using a knowledge based system, said classified, pre-processed signal to produce an interpreted signal.

15. The apparatus of claim 14, further comprising an interactive system which receives said detected signal and said interpreted signal and wherein said interactive system produces an event bulletin.

16. The apparatus of claim 15, further comprising:
   a local area network (LAN) connected to said detecting means, said interpreting means, and said interactive system;
   a system monitor connected to said LAN; and
   an archiver connected to said LAN and said detecting means.

17. The apparatus of claim 14, wherein said SONN is a Kohonen Network.

18. The apparatus of claim 14, wherein said SONN is an Adaptive Resonance Theory Network.

19. The apparatus of claim 14, wherein said SONN is a hybrid comprised of a Kohonen network in combination with a network selected from a group consisting of an Adaptive Resonance Theory Network and an Adaptive Kohonen Network.

20. The apparatus of claim 14, wherein said SONN is selected from a group consisting of a Kohonen Network, an Adaptive Resonance Theory Network (ART), an Adaptive Kohonen Network (AK) and a hybrid comprised of a Kohonen Network and a network selected from a group consisting of an ART and an AK.

* * * * *